United States Patent [19]

Miyama et al.

[11] 4,179,541

[45] Dec. 18, 1979

[54] PHOTOGRAPHIC SUPPORT MATERIAL AND METHOD OF PRODUCING SAME

[75] Inventors: Masao Miyama; Sakan Yamaguti; You Kusama, all of Tokyo, Japan

[73] Assignee: Mitsubishi Paper Mills, Ltd., Tokyo, Japan

[21] Appl. No.: 824,114

[22] Filed: Aug. 12, 1977

[30] Foreign Application Priority Data

Aug. 16, 1976 [JP] Japan ................................ 51-96947

[51] Int. Cl.[2] ......................... B32B 3/30; B05D 5/02; B32B 31/20

[52] U.S. Cl. .................................. 428/165; 427/264; 427/275; 427/278; 428/161; 156/209; 156/244.24; 430/496; 430/536

[58] Field of Search ...................... 427/275, 278, 264; 428/161, 165; 96/85; 156/209, 244.24

[56] References Cited

U.S. PATENT DOCUMENTS

| | | | |
|---|---|---|---|
| 2,161,990 | 6/1939 | Asnes | 427/275 X |
| 3,411,908 | 11/1968 | Crawford et al. | 96/85 X |
| 3,853,592 | 12/1974 | Crawford et al. | 96/85 X |
| 3,959,546 | 5/1976 | Hill | 427/278 X |

*Primary Examiner*—Evan K. Lawrence

*Attorney, Agent, or Firm*—Cushman, Darby & Cushman

[57] ABSTRACT

An embossed photographic support material is produced by extrusion coating a polyolefin resin over a pattern embossed on a base paper material and pressing the polyolefin resin onto the embossed paper with a cooling roll. The cooling roll has a surface finish to impart the desired amount of gloss to the embossed surface.

12 Claims, 3 Drawing Figures

PHOTOGRAPHIC SUPPORT MATERIAL AND METHOD OF PRODUCING SAME

BACKGROUND OF THE INVENTION

This invention relates to a method for producing a photographic support material. More particularly, it relates to a method for producing a polyolefin-coated support material for photographic print paper having a formed pattern such as silk-like pattern.

A variety of methods have heretofore been proposed for imparting a silk-like pattern to the surface of a polyolefin-coated paper. Such proposed methods include so-called grain roll process in which an embossed pattern is imparted to the photographic print paper after the treatment of image print has been completed; a method in which embossing is carried out immediately after coating a photographic emulsion on a polyolefin coated paper; another method wherein the mirror surface of a polyolefin coated paper is embossed by means of an embossing machine; and still another method in which the polyolefin surface is embossed by means of an engraved cooling roll during the step of extrusion-coating a polyolefin resin on a base paper.

When embossing is carried out by any of the above methods, non-uniformity, deformation, flaws, etc., of the engraved pattern on the embossing roll are apt to be replicated on the surface of the polyolefin coated paper, resulting in non-uniform surface, speckles on the surface, uneven gloss, etc. Particularly when an engraved form with a regularly repeated pattern such as silk-like pattern is used to emboss photographic print paper which requires relatively shallow embossing in conformity with the nature of its use, there appear on the embossed polyolefin coated paper diagonal streaks due to feed marks which are often produced on the embossing roll during engraving operation, thus resulting in non-uniform silk-like pattern on the embossed surface. Even when an embossing roll with a uniform pattern is used, there appears, in some cases, glariness on the print paper depending on the design of pattern. The above defects much spoil the quality of a photographic print paper. In order to avoid the above problems, it is necessary to engrave the embossing roll with high precision and to select a suitable design of the pattern. These, however, are technically very difficult and result in increased engraving cost. It is also very difficult to eliminate the feed marks in engraving a roll in a pattern of small depths such as a silk-like pattern.

The present inventors have accomplished this invention as a result of extensive studies to produce an embossed polyolefin-coated paper without the aforesaid defects.

SUMMARY OF THE INVENTION

This invention provides a support material for photographic print paper and the process for preparing the same by coating a polyolefin resin on a base paper material having an embossed pattern and pressing the polyolefin resin onto the embossed paper with a cooling roll to produce an embossed polyolefin-coated paper. The amount of gloss of the embossed surface is controlled by means of the surface finish of the cooling roll.

This invention relates to a method for producing a polyolefin-coated paper having, for example, an embossed silk-like pattern, which has none of the abovesaid defects of the conventionally prepared polyolefin-coated paper having, for example, a silk-like pattern, which comprises coating a polyolefin resin such as polyethylene resin on a base paper material which has been previously embossed in, for example, silk-like pattern. The polyolefin-coated paper embossed in, for example, silk-like pattern prepared according to this invention does not show non-uniformity or speckles in the surface or uneven gloss or glariness. Particularly in the case of an embossed silk-like pattern, even if a silk-like pattern embossing roll having feed marks is used to impart the pattern to a base paper material, there is obtained according to this invention a polyolefin-coated paper with embossed silk-like pattern having no feed marks or diagonal streaks, because a polyolefin resin is coated on an embossed base paper material. Accordingly, particularly when performing shallow embossing of a strictly regular pattern, the present method is advantageously used over a conventional method which comprises embossing the polyolefin coating layer by means of a cooling roll bearing an engraved pattern during the step of extrusion coating of a polyolefin resin on a base paper. The conventional methods required an embossing roll provided with a high-precision engraved pattern which is expensive due to a high engraving cost, whereas the method of this invention does not need engraving of so high a precision and, hence, so high an engraving cost. In the present method, moreover, the pattern on the polyolefin surface can be modified by varying the thickness of the polyolefin coating layer, even though one and the same embossing roll is used in preparing the embossed base paper material.

DETAILED DESCRIPTION OF THE INVENTION

According to the present invention, various patterns can be embossed as needed on the base paper material, including patterns of silk-like, matted, cloth-like, and grain surfaces. The pattern depth of the embossing roll depends on the type of pattern and can be varied in a considerable range. In the case of silk-like embossing for example, the depth of the embossed pattern on the base paper material is preferably 10 to 100$\mu$, most preferably 20 to 50$\mu$. Embossing on the base paper material can be performed during the step of continuous extrusion coating of a polyolefin resin on the base paper material before said coating is applied or in various other ways. When plain photographic paper is used as the base paper material, embossing can be performed continuously in line with the winding operation. If necessary, the embossing roll can be heated in embossing on a base paper material.

The paper materials used in the present invention include plain paper, synthetic paper, paper-like synthetic resin film, and these materials with pigment coating. The pigments used in pigment coated papers include baryta (barium sulfate), clays, kaolin, talc, calcium carbonate, titanium dioxide, and zinc oxide. Examples of preferred pigment coated papers include baryta paper. As compared with plain paper, baryta paper gives sharper embossed pattern.

Figure 1:
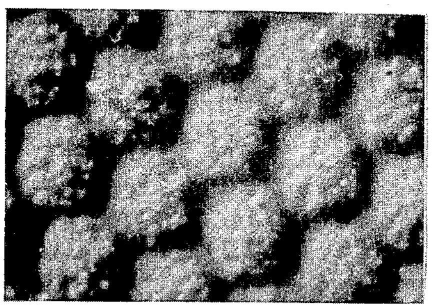
FIG. 1 shows an enlarged photograph (×80) of the surface of a photographic support material which is made by extrusion-coating polyethylene on a baryta paper which has been embossed so as to have an embossed pattern (enlarged as ×80) shown by FIG. 3, by applying pressure by means of a cooling roll having a matte surface.
Figure 2:
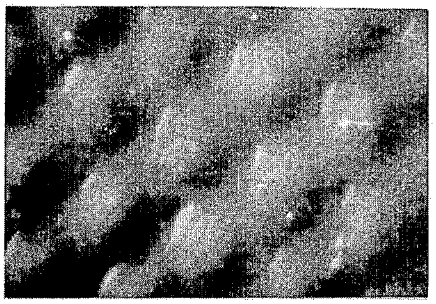
FIG. 2 shows the surface obtained using a cooling roll having a mirror surface.

Although various procedures are conceivable for coating a polyolefin resin on base paper materials, extrusion coating is particularly preferable. In coating a polyolefin resin by extrusion on the base paper material, the gloss of the embossed polyolefin coated paper material can be varied by using a cooling roll of mirror finish or various matte finishes. FIGS. 1 and 2 show the variation in gloss of the embossed surface obtained with a cooling roll having a matte surface and a mirror surface, respectively. The polyolefins for use in the present invention include polyethylene, polypropylene, polyisobutylene, copolymers of ethylene and propylene as major components, and mixtures of these materials. The thickness of the polyolefin coating layer is not critical, but is preferably 5 to 60μ, most preferably 10 to 50μ.

The invention is illustrated below in further detail with reference to Examples, but the invention is not limited to Examples.

EXAMPLE 1

A silk-like pattern was embossed on one side of a photographic paper, 180 $g/m^2$ in basis weight, by means of an embossing roll bearing the engraved silk-like pattern. The side of paper bearing the silk-like pattern was extrusion-coated with polyethylene resin at a coating rate of 30μ (Sample 1). The cooling roll used in the coating had a matted surface.

On the other hand, a polyethylene-coated paper having a polyethylene layer of 30μ and a silk-like textured surface was prepared by extrusion coating on one side of a photographic paper, 180 $g/m^2$ in basis weight, using a cooling roll having an engraved silk-like pattern, 20μ in pattern depth (Sample 2).

Both Samples 1 and 2 had a pattern depth in the polyethylene layer of 14μ and a gloss of about 15%, as measured by the method of JIS Z 8741. Diagonal streaks, glariness and uneven gloss were observed on Sample 2, whereas none of such defects was detected on Sample 1.

EXAMPLE 2

A silk-like pattern was embossed on one side of a photographic paper, 180 $g/m^2$ in basis weight, by means of an embossing roll bearing the engraved silk-like pattern. The side of paper having the embossed silk-like pattern was extrusion-coated with polyethylene resin at a coating thickness of 15μ. The cooling roll used in the extrusion coating had a matted surface. The embossed pattern depth in the polyethylene layer was 14μ. The resulting polyethylene-coated patterned paper had a gloss of about 25% and showed no diagonal streaks, glariness, or uneven gloss.

EXAMPLE 3

Figure 3:
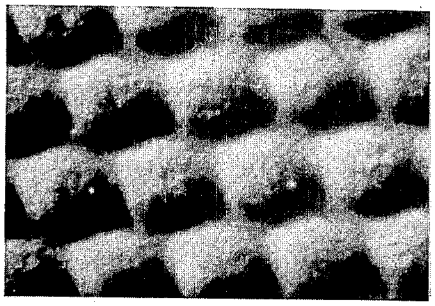

A photographic paper, 250 $g/m^2$ in basis weight, was coated on one side with baryta at a rate of 40 $g/m^2$. A silk-like pattern was then embossed on the baryta coating layer by means of an embossing roll having the silk-like pattern (FIG. 3). Polyethylene resin was then extrusion-coated over the patterned baryta layer at a rate of 15μ to obtain a polyethylene-coated paper. The cooling roll used in the polyethylene coating had a matted surface. The silk-like pattern in the polyethylene layer was very sharp and had a depth of 10μ. This polyethylene-coated paper had a gloss of about 15% and showed no diagonal streaks, glariness, or uneven gloss (FIG. 1).

EXAMPLE 4

A polyethylene-coated paper was prepared in the same manner as in Example 3, except that the cooling roll having a mirror surface was used. The resulting polyethylene-coated paper had a gloss of about 85%. The silk-like pattern was very sharp and there was no diagonal streak on the surface (FIG. 2).

What is claimed is:

1. A method for producing a photographic support material, which comprises extrusion-coating a polyolefin resin over a pattern embossed on a base paper material and pressing the polyolefin resin coating onto the embossed paper with a cooling roll to form an embossed polyolefin-coated paper, said cooling roll having a surface finish to impart a desired amount of gloss to the embossed surface.

2. A method according to claim 1, wherein the polyolefin resin is polyethylene.

3. A method according to claim 1, wherein the pattern is a silk-like pattern.

4. A method according to claim 3, wherein the thickness of the polyolefin coating is 10 to 25μ.

5. A method according to claim 1, wherein the base paper material is a plain paper.

6. A method according to claim 1, wherein the depth of the pattern on the base paper material is 20 to 50μ.

7. A method according to claim 1, wherein the base paper material is a pigment coated paper.

8. A method according to claim 7, wherein the pigment coated paper is a baryta paper.

9. A method according to claim 1 including the step of embossing the base paper by means of an embossing roll prior to the extrusion of the polyolefin resin.

10. A method according to claim 1 wherein the cooling roll has a matte surface finish.

11. A method according to claim 1 wherein the cooling roll has a mirror surface finish.

12. A photographic support material produced by the method according to claim 1.

* * * * *